June 10, 1924.
W. W. SCOTT
CHICKEN FEEDER
Filed Aug. 17, 1922
1,497,596
2 Sheets-Sheet 1
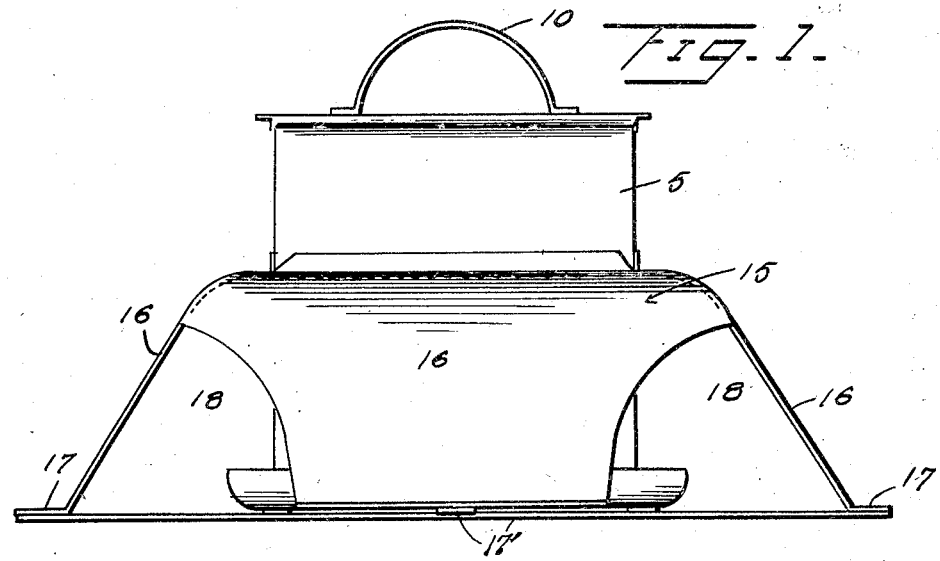
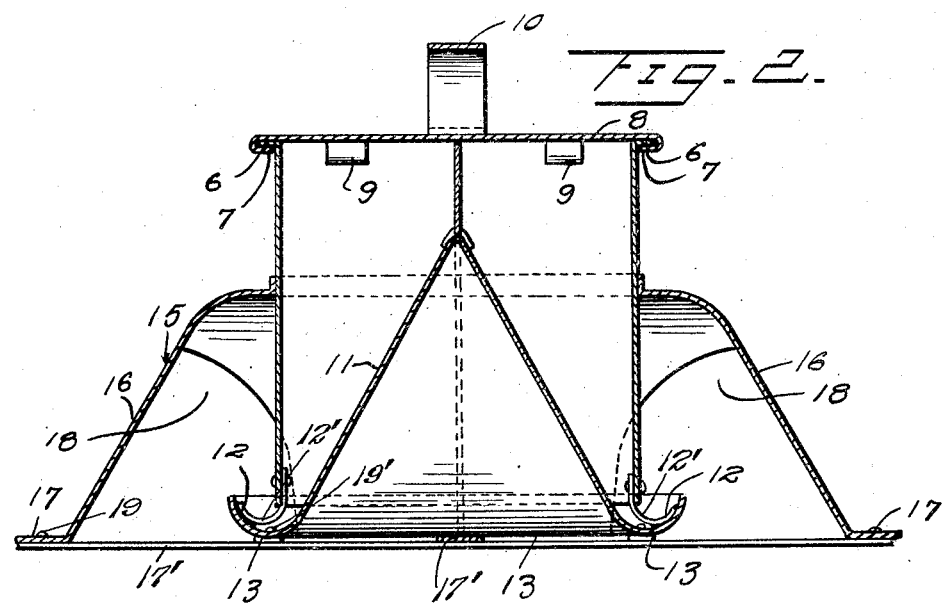
Inventor
W. W. Scott,
By William J. Jacobi
Attorney

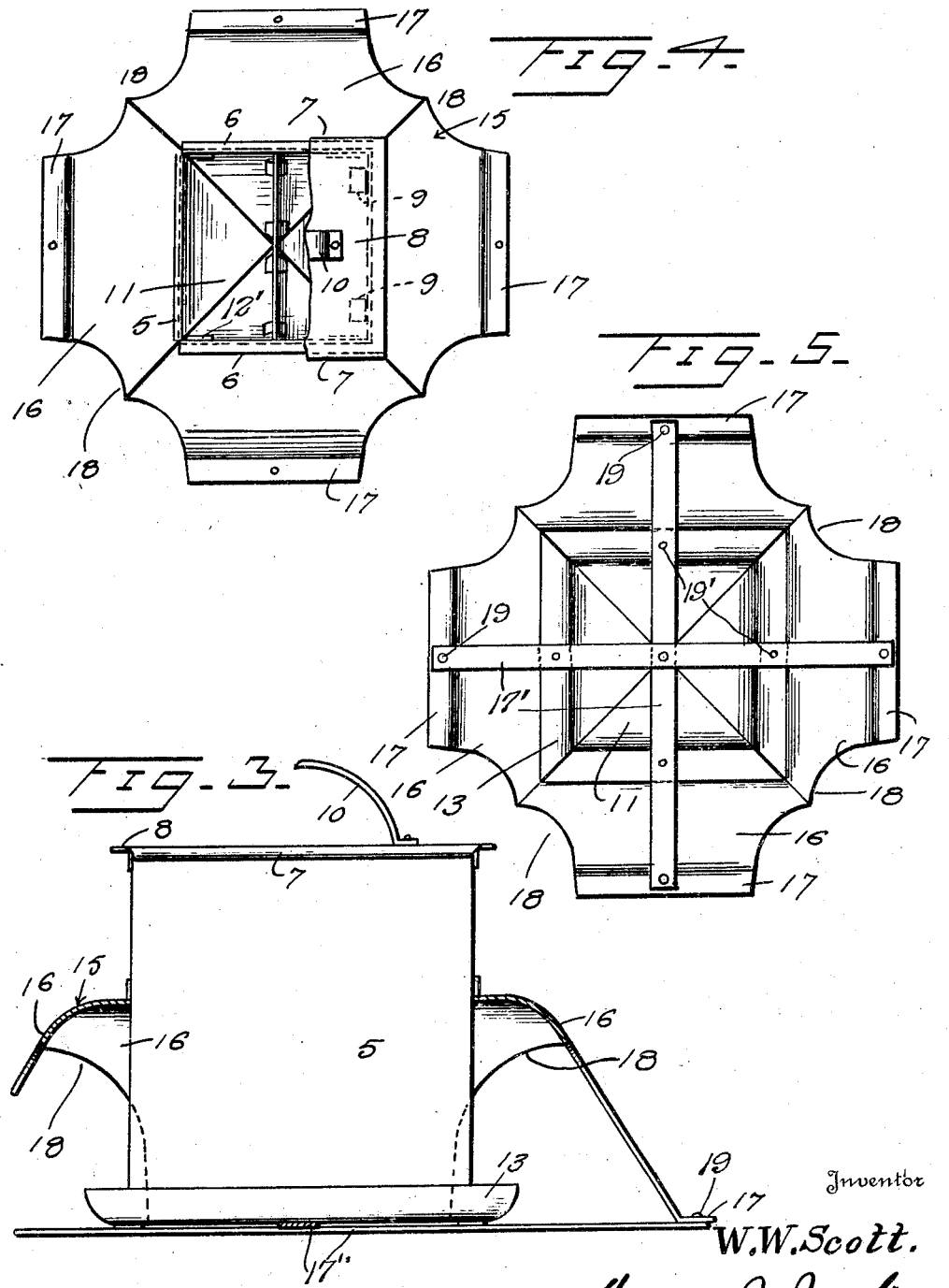

Patented June 10, 1924.

1,497,596

UNITED STATES PATENT OFFICE.

WILLIAM W. SCOTT, OF ALGONA, IOWA, ASSIGNOR OF ONE-HALF TO FRED CARTER, OF ALGONA, IOWA.

CHICKEN FEEDER.

Application filed August 17, 1922. Serial No. 582,399.

*To all whom it may concern:*

Be it known that WILLIAM W. SCOTT, a citizen of the United States, residing at Algona, in the county of Kossuth and State of Iowa, has invented certain new and useful Improvements in Chicken Feeders, of which the following is a specification.

My invention relates to chicken feeders and its principal object is to provide a chicken feeder adapted to contain a quantity of feed and feed the same to the chickens automatically as it is consumed.

A further object of the invention is to provide a chicken feeder wherein the feed will be dispensed or discharged from the feeder by gravity as the feed is consumed and which will be protected against damp weather thus obviating the danger of the chickens eating sour feed.

Still another object of the invention is to provide a chicken feeder of this character which is constructed from sheet metal and therefore will not be damaged by the elements and cannot be readily overturned by the wind.

Further the invention contemplates a chicken feeder for automatically dispensing the feed to the chickens and will retain the same in a sanitary condition at all times.

With the preceding and other objects and advantages in mind, the invention consists in the novel combination of elements, constructions and arrangement of parts and operations to be hereinafter specifically referred to, claimed and illustrated in the accompanying drawing, wherein—

Figure 1 is a side elevation of a chicken feeder constructed in accordance with my invention.

Figure 2 is a vertical sectional view of the same.

Figure 3 is an elevation of the feeder having one of the outer walls broken away.

Figure 4 is a top plan view with the cover partly removed.

Figure 5 is a bottom plan view of the device.

Referring in detail to the drawing wherein corresponding characters of reference denote corresponding parts throughout the several views, the numeral 5 denotes a rectangular casing open at the top and bottom and having a pair of guide flanges 6 at its upper end to receive guides 7 on a slidable top or cover 8. This cover or top 8 is provided with a pair of stops 9 upon its underface adapted to engage one of the walls of the casing to limit the movement of the cover in one direction and further provided with a handle 10.

Arranged centrally within the casing 5 is a pyramid-shaped bottom 11 whose walls at the lower end are spaced from the walls of the casing 5 and project downwardly beyond the same and are secured thereto at its corners by means of spacing bars 12 secured by solder or the like as indicated at 12'. As shown in Fig. 2 the ends of the walls of the pyramid-shaped bottom extend outwardly beyond the walls of the casing 5 and are bent to afford a trough 13 which extends entirely around the lower end of the casing or hopper 5. From the description thus far given it follows that chicken feed arranged in the casing or hopper 5 will gravitate down the sides of the pyramid-shaped bottom 11 and flow into the trough 13. As the feed contained in the trough 13 is consumed it is readily replaced by additional feed from the hopper.

In order to protect the feed contained in the trough 13 a sheet metal hood 15 is provided and consists of a plurality of outwardly and angularly disposed sheet metal walls 16 secured to the side walls of the hopper or casing 5 and have their lower longitudinal edges bent at right angles to afford feet 17 that rest upon the ground. The corners of the walls 14 are cut out to afford entrance openings 18 or openings of sufficient size to permit the heads of older chickens to reach the trough.

To further brace the hood 15 I provide a pair of bracing bars 17' extending at right angles to each other and across the bottom of the feeder, as clearly shown in Fig. 5 of the drawings. These bracing bars 17' may be riveted or otherwise secured to the hood 15 and trough 13, as indicated at 19 and 19' respectively. It will thus be seen that the feeder will retain its shape by being securely braced as described.

From the disclosure it will be seen that I have provided a simple and inexpensive chicken feeder wholly constructed from sheet metal and which will automatically dispense the feed to the chickens as it is consumed. Also the device is weather-proof and will not deteriorate by the action of the elements.

From the foregoing it will be seen that I have provided a simple, inexpensive and efficient means for carrying out the objects of the invention, and while I have particularly described the means best adapted to perform the functions set forth, various changes in form, proportion and in the minor details of construction may be resorted to without departing from the spirit or sacrificing any of the principles of the invention.

What I claim as new and desire to secure by Letters Patent is:—

1. A device of the character described including a hopper, a cover therefor, the bottom of the hopper having inclined walls, a trough surrounding the lower edge of the hopper and adapted to receive feed from the inclined walls, a hood encircling the hopper and having its upper edge attached thereto and the walls thereof extended outwardly to overlie the trough and having openings at the corners thereof to permit the chickens to reach the trough, and bracing bars extending at right angles to each other and attached to the under faces of the trough and the hood respectively.

2. A device of the class described comprising a hopper, a pyramidal-shaped bottom arranged therein and spaced from the lower edges of the hopper, a trough carried by said bottom, arcuate spacing bars securing the lower edges of the hopper to said trough, a hood encircling the hopper intermediate the ends thereof, and inclined outwardly and downwardly to the same plane as the lowermost portion of the trough and cut away at predetermined points to provide chicken entrance openings, and bracing bars extending at right angles to each other and secured to the under faces of the trough and hood respectively.

In testimony whereof I affix my signature.

WILLIAM W. SCOTT.